(12) United States Patent
Kawashima et al.

(10) Patent No.: US 7,893,688 B2
(45) Date of Patent: Feb. 22, 2011

(54) PERMANENT MAGNET TYPE POSITION SENSOR

(75) Inventors: Takashi Kawashima, Nagoya (JP); Kimio Uchida, Kariya (JP); Yukinobu Kajita, Takahama (JP); Tatsuya Kitanaka, Nagoya (JP); Koichiro Matsumoto, Kariya (JP); Yoshiyuki Kono, Obu (JP); Hisataka Okado, Chita-gun (JP); Hiroyuki Shintani, Nagoya (JP)

(73) Assignee: Denso Corporation, Kariya (JP)

( * ) Notice: Subject to any disclaimer, the term of this patent is extended or adjusted under 35 U.S.C. 154(b) by 423 days.

(21) Appl. No.: 12/181,783

(22) Filed: Jul. 29, 2008

(65) Prior Publication Data

US 2009/0033315 A1 Feb. 5, 2009

(30) Foreign Application Priority Data

| Jul. 30, 2007 | (JP) | ............................ 2007-196948 |
| Nov. 1, 2007 | (JP) | ............................ 2007-284924 |
| Feb. 27, 2008 | (JP) | ............................ 2008-045881 |

(51) Int. Cl.
*G01B 7/14* (2006.01)

(52) U.S. Cl. .............................. 324/207.24; 324/207.23

(58) Field of Classification Search ........................ None
See application file for complete search history.

(56) References Cited

U.S. PATENT DOCUMENTS

| 6,211,668 | B1 | 4/2001 | Duesler et al. |
| 6,304,078 | B1 | 10/2001 | Jarrard et al. |
| 6,426,619 | B1 | 7/2002 | Pfaffenberger et al. |
| 6,515,473 | B2 | 2/2003 | Pfaffenberger et al. |
| 6,809,512 | B2 | 10/2004 | Pfaffenberger et al. |
| 2003/0112006 | A1* | 6/2003 | Luetzow ................. 324/207.21 |
| 2004/0008025 | A1* | 1/2004 | Johnson et al. ........... 324/207.2 |
| 2006/0028203 | A1* | 2/2006 | Kawashima et al. ... 324/207.25 |

FOREIGN PATENT DOCUMENTS

JP 2000-180114 3/2000

\* cited by examiner

*Primary Examiner*—Paresh Patel
(74) *Attorney, Agent, or Firm*—Nixon & Vanderhye PC

(57) ABSTRACT

A position sensor includes a longitudinally extending permanent magnet member at least two longitudinally extending arc-shaped projecting elements respectively projecting from the opposite ends toward the inside space to confront each other at a distance and a pair of compatible main magnetic sensors disposed in the inside space along the longitudinal axis at an interval so as to generate a pair of output signals when the permanent magnet member shifts along the longitudinal axis. The opposite ends of the permanent magnet member are configured to surround a common inside space and polarized to have opposite magnetic poles so as to provide in the inside space a magnetic field whose magnetic flux density becomes a maximum at a longitudinal center of the inside space and gradually becomes smaller as a position of the inside space shifts from the longitudinal center along a longitudinal axis of the permanent magnet members. The arc-shaped projecting elements are arranged so that the magnetic flux density and each of the output signals can be expressed by a cosine of a shift value from the longitudinal center, and the interval is ¼ of the cycle of the cosine.

11 Claims, 10 Drawing Sheets

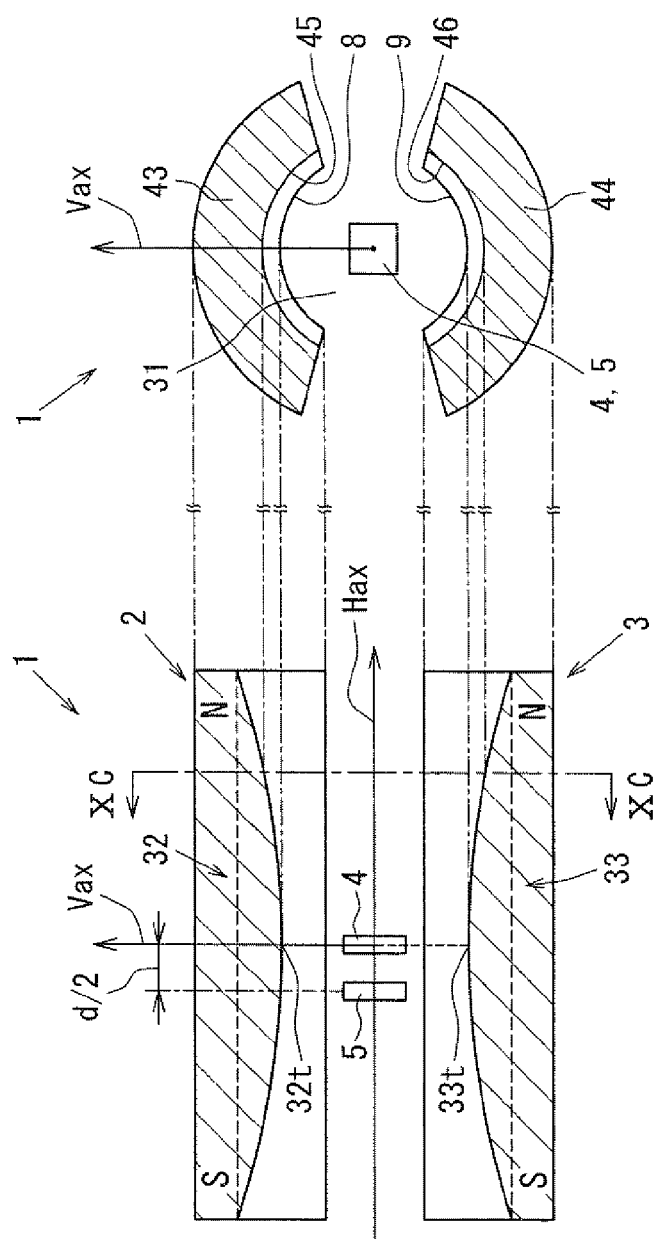

PERMANENT MAGNET TYPE POSITION SENSOR

CROSS REFERENCE TO RELATED APPLICATION

The present application is based on and claims priority from Japanese Patent Applications: 2007-196948, filed Jul. 30, 2007; 2007-284924, filed Nov. 1, 2007 and 2008-45881, filed Feb. 27, 2008, the contents of which are incorporated herein by reference.

BACKGROUND OF THE INVENTION

1. Field of the Invention

The present invention relates to a permanent magnet type position sensor for detecting position of a moving member of an automobile, such as a power roller position sensor of a toroidal CVT, a height sensor of a suspension control system, a cam stroke sensor, an EGR lift sensor, or an accelerator pedal position sensor.

2. Description of the Related Art

JP-A-2000-180114 or, its counterpart, U.S. Pat. No. 6,809,512 discloses such a permanent magnet type position sensor This sensor includes a movable permanent magnet member that provides a magnetic field and a stator that provides an electric signal by sensing a change in the magnetic field when the movable permanent magnet member moves. The movable permanent magnet member of the above disclosed sensor includes a pair of permanent magnets forming two magnetic fields that are opposite to each other to provide two output signals, which are also opposite to each other. The electric signals are given to an electric control unit (ECU) to control a certain device.

However, the electric signals are likely to change as the temperature around the sensor changes. Hence, it is difficult to accurately detect the position of the object without taking the temperature change into account.

SUMMARY OF THE INVENTION

An object of the invention is to provide an improved permanent magnet type position sensor that can detect an accurate position even if the temperature around the sensor changes.

According to an aspect of the invention, a position sensor includes a longitudinally extending permanent magnet member having opposite ends polarized to have opposite magnetic poles, at least two longitudinally extending arc-shaped projecting magnetic elements respectively projecting from the opposite ends toward the inside space to confront each other at a distances a pair of main magnetic sensors disposed in the inside space along the longitudinal axis at an interval so as to generate a pair of output signals when the permanent magnet member shifts along the longitudinal axis. The opposite ends are configured to surround the common inside space so as to provide in the common inside space a magnetic field whose magnetic flux density becomes a maximum at a longitudinal center of the inside space and gradually becomes smaller as a position of the inside space shifts from the longitudinal center along a longitudinal axis of the permanent magnet members. The arc-shaped projecting elements are arranged so that each of the output signals can be expressed by a cosine of a shift value from the longitudinal center; and the interval is ¼ of the cycle of the cosine.

In the above described position sensor: the permanent magnet member may include a pair of semi-cylindrical or prism-like permanent magnets that have a uniform side width along the longitudinal direction thereof and are disposed side by side in such that the tops of the projecting elements confront each other; on the other hand, the permanent magnet member may be a cylindrical permanent magnet; each of the arc-shaped projecting element may include a pair of magnetic yokes respectively extending from opposite ends of one of the permanent magnets.

The above position sensor may include an offset adjusting circuit for subtracting a mean value of the maximum and minimum of output signals of the main magnetic sensors as an offset value from the output signals of the main magnetic sensors and an inverse trigonometric function processor for providing an inverse trigonometric value from an output signal of the offset adjusting circuit. Each of the magnetic sensor may be a Hall element. The offset adjusting circuit and the inverse trigonometric function processor may be integrally formed in a chip.

The above position sensor may include an angle correction magnetic sensor disposed in the inside space so as to detect an inclination of the pair of main magnetic sensors to a normal direction. In this aspect, the pair of main magnetic sensors has sensing surfaces facing to the longitudinal direction of the permanent magnet member, and the angle correction magnetic sensor has a sensing surface inclined perpendicular to the sensing surfaces of the main magnetic sensors. The angle correcting magnetic sensor may be disposed between the pair of main magnetic sensors.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 10A, 10B and 10C show a position sensor according to the fourth embodiment of the invention;

DETAILED DESCRIPTION OF THE PREFERRED EMBODIMENTS

Several preferred embodiments according to the present invention will be described with reference to the appended drawings.

A position sensor 1 according to the first embodiment of the invention will be described with reference to FIGS. 1-7.

The position sensor 1 includes a permanent magnet member that is comprised of a pair of permanent magnets 2, 3 and a sensor assembly 19 that includes a pair of magnetic sensors 4, 5. The pair of permanent magnets 2, 3 forms a magnetic field and moves along the horizontal axis Hax in response to a moving object whose position is to be detected. The pair of magnetic sensors 4, 5 senses a change in the magnetic field and provides a pair of digital electric signals. The position sensor 1 is mounted in a vehicle, and the digital electric signals are processed to form an inverse trigonometric function, which is inputted to an electronic control unit (ECU) to control various devices.

Figure 1B:
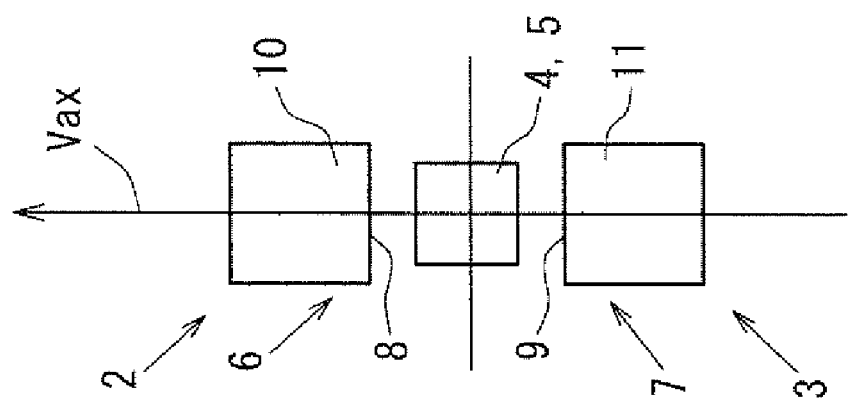
FIGS. 1A and 1B show a position sensor according to the first embodiment of the invention.
Figure 1A:
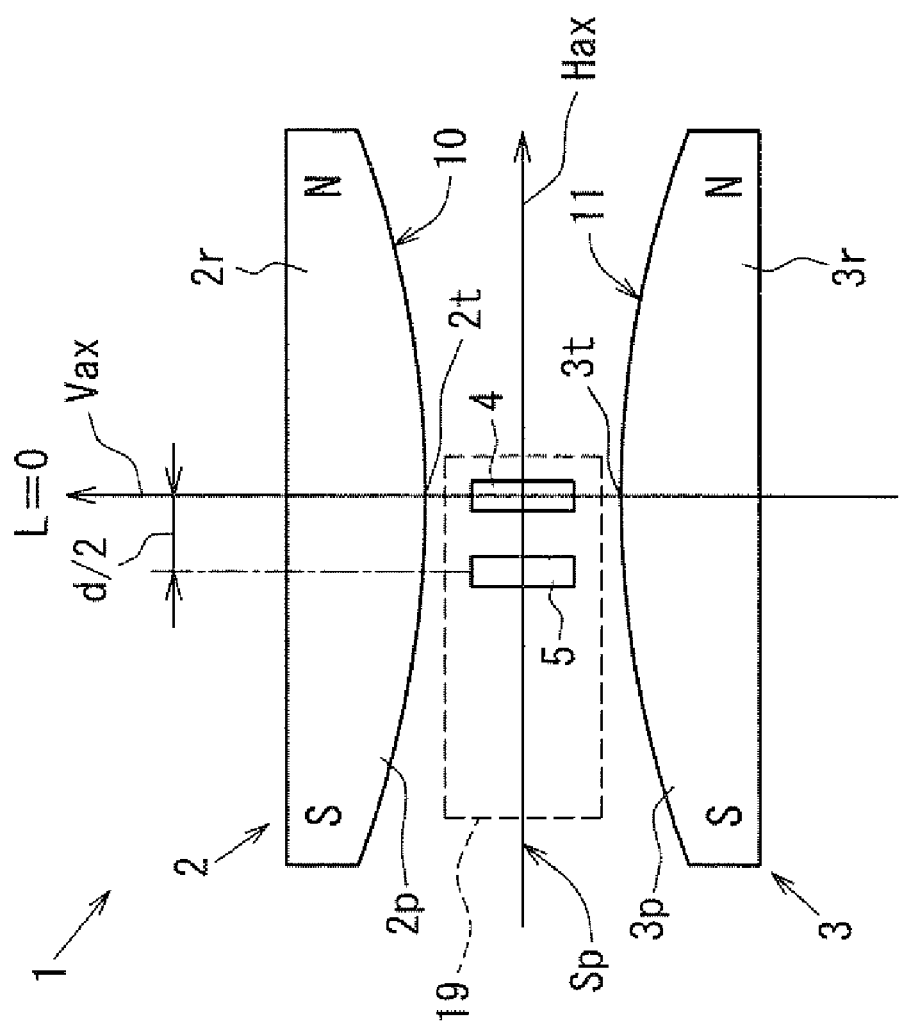
Figure 2:
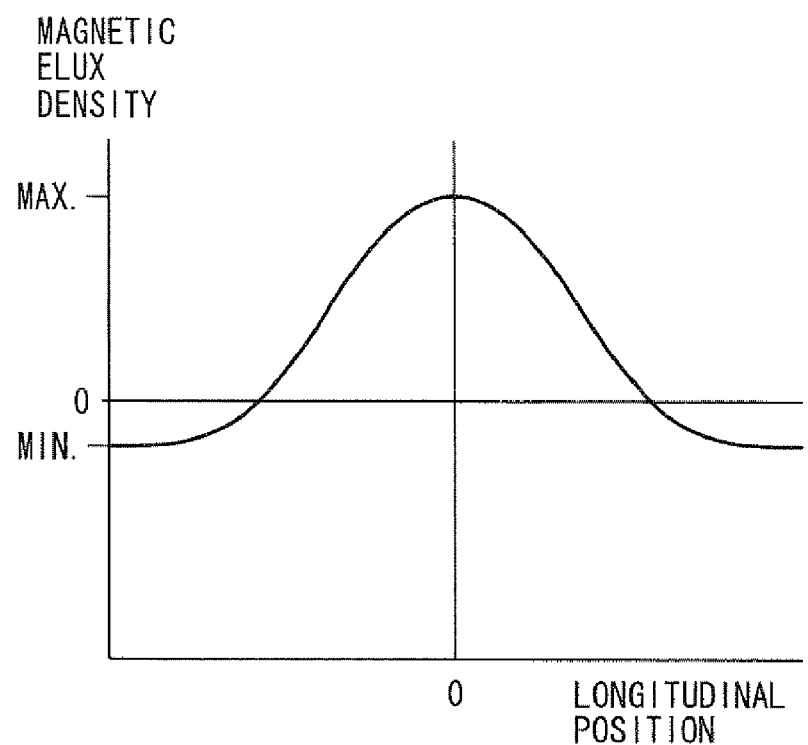
FIG. 2 is a graph showing a relation between the longitudinal position of a permanent magnet used in the position sensor and the magnetic flux density thereof.

Each of the permanent magnets 2, 3 has a prism-like rod portion 2r or 3r and an arc-shaped projecting portion 2p or 3p that projects from one side surface of the rod portion 2r or 3r between the opposite ends. Each of the permanent magnets 2, 3 is polarized in the longitudinal direction that is parallel to the horizontal axis Hax to have an S-pole at one end thereof and an N-pole at the other end. The pair of permanent magnets 2, 3 is disposed side by side in such that the tops 2t, 3t of the projecting elements 2p, 3p and the same magnetic poles confront each other, as shown in FIG. 1A. Each of the pair of permanent magnets 2, 3 also has a uniform side width along the longitudinal axis Hax as shown in FIG. 1B, thereby forming the permanent magnet member that provides a magnetic field in the inside space between the permanent magnets 2, 3. In other words, the pair of permanent magnets is disposed in plane-symmetric with respect to a plane Sp that includes the horizontal axis Hax. In this magnetic field, magnetic flux density is the maximum at the center thereof in the longitudinal direction (magnetic center) and gradually decreases as the longitudinal position of the space leaves from the magnetic center, as shown in FIG. 2. Incidentally, a vertical axis Vax includes the magnetic center, whose longitudinal position L is 0.

Figure 7:
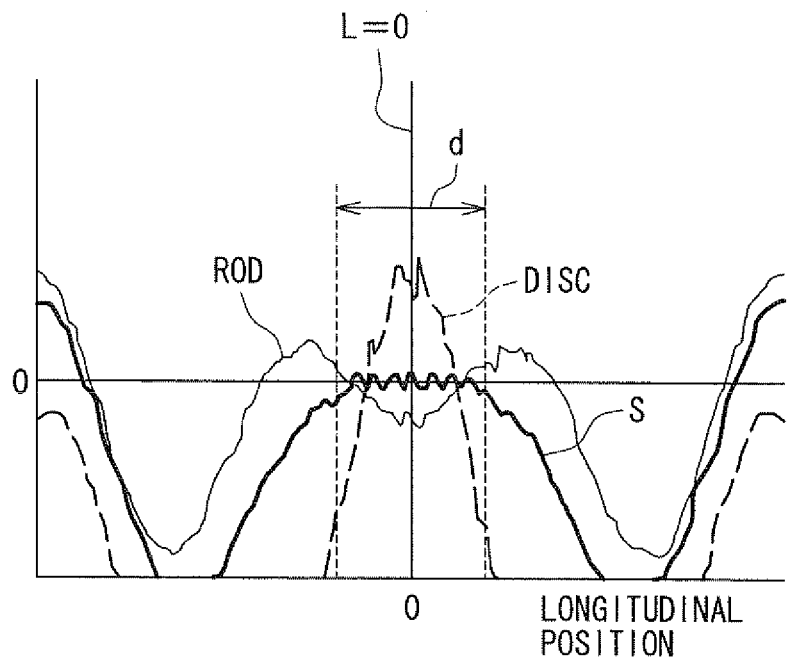
FIG. 7 is a graph showing characteristic curves of magnetic flux density provided by permanent magnets having different shapes.

The arc-shaped projecting elements 2p, 3p are formed so that the magnetic flux density characteristic curve changes along an approximate cosine curve S, as shown by a thick solid line in FIG. 7, where, a broken line indicates a magnetic flux density characteristic curve formed by a pair of rod-shaped permanent magnets having no arc-shaped projecting elements, and a thin solid line indicates a magnetic flux density characteristic curve formed by a pair of disk-like permanent magnets having no arc-shaped projecting elements.

Each of the magnetic sensors 4, 5 is comprised of a Hall element and a processor, which are formed on an IC chip so as to provide the digital electric signals. The magnetic sensors 4, 5 are disposed spaced apart from each other at a distance d/2 along the horizontal axis Hax in the inside space between the permanent magnets 2, 3. Incidentally, a distance d/2 corresponds to a quarter of the cycle of the cosine shown in FIG. 3.

Figure 3:
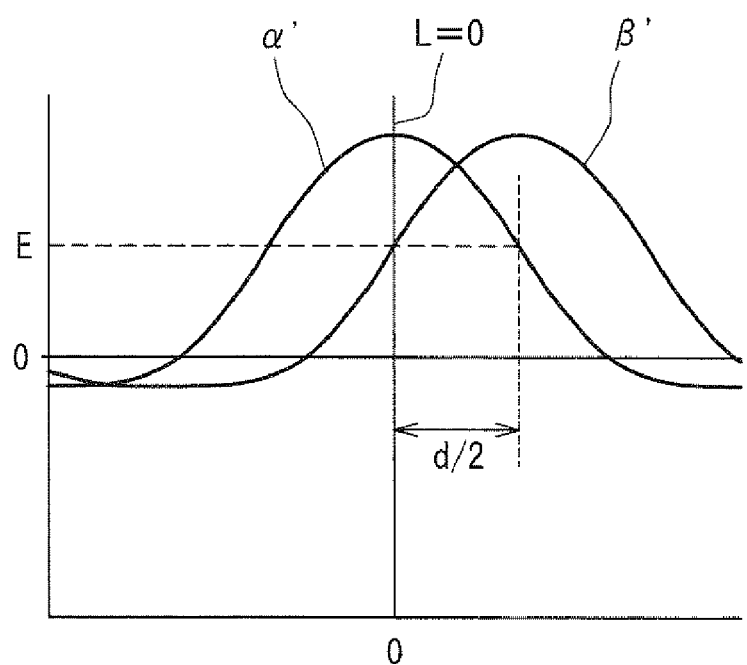
FIG. 3 is a graph showing relations between the respective longitudinal positions of a pair of permanent magnets used in the position sensor and output signals of a pair of magnetic sensors.

The magnetic sensors 4, 5 are the same in performance and size and compatible with each other. Therefore, the digital signals of the magnetic sensors 4, 5 draw approximate cosine curves $\alpha$, $\beta$ that respectively represent the magnetic flux density as the permanent magnets 2, 3 move along the horizontal axis Hax from the Vertical axis Vax where the longitudinal position L=0, as shown in FIG. 3. Incidentally, the amplitude of the characteristic curves $\alpha$, $\beta$ are adjusted to be same to each other.

Figure 4A:
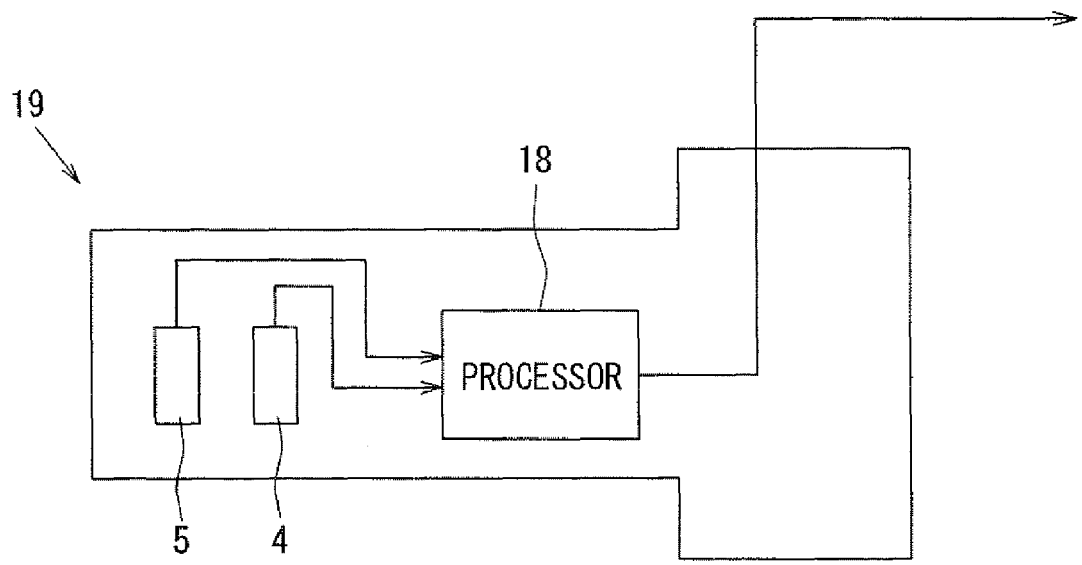
FIG. 4A is a block diagram of a sensor assembly and FIG. 4B is a block diagram of a processor.
Figure 4B:
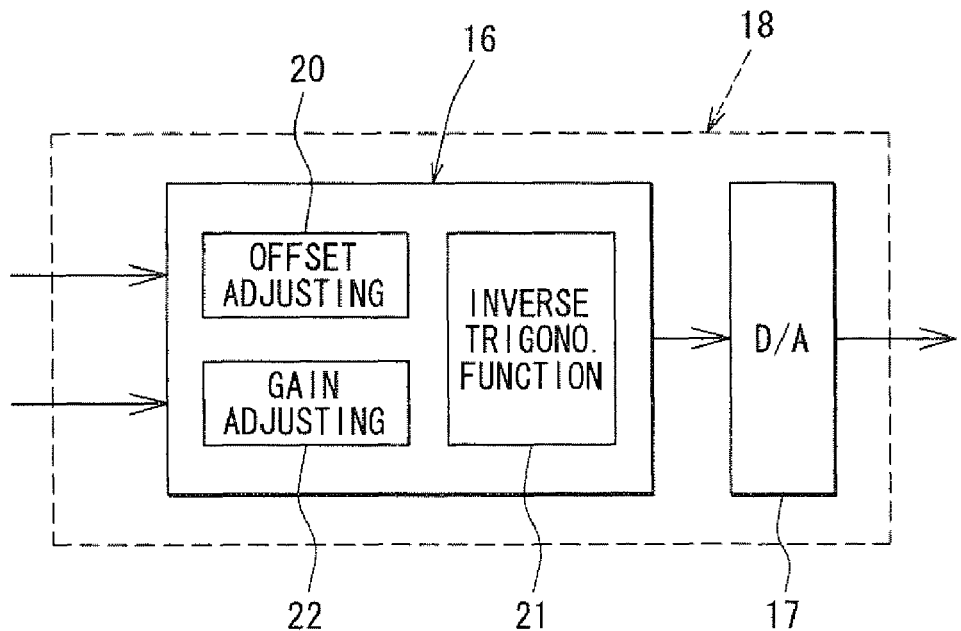
Figure 5:
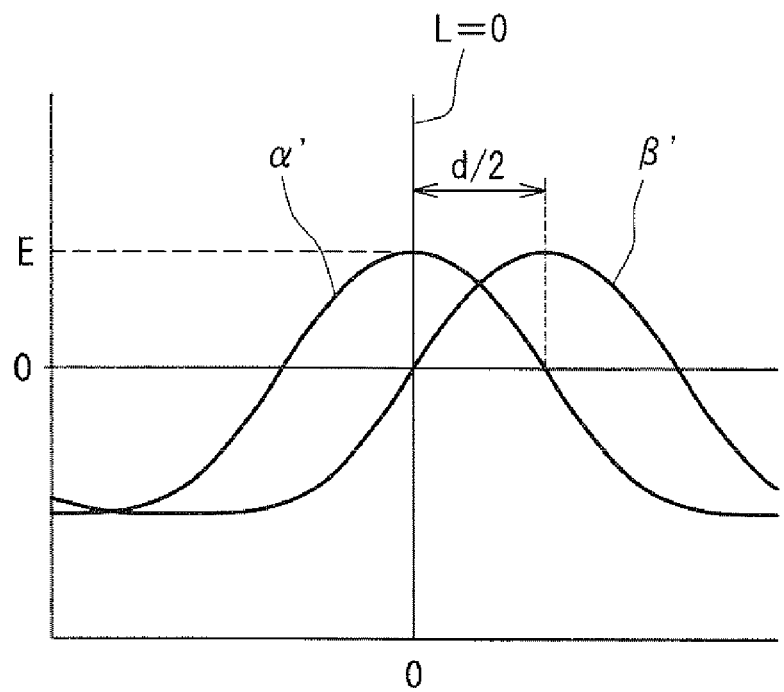
FIG. 5 is a graph showing relations between the respective longitudinal positions of the pair of permanent magnets and the output signals after offset adjustment.

As shown in FIG. 4A, the magnetic sensors 4, 5 are connected to a processor circuit 18 to form a sensor assembly 19. The processor circuit 18 is comprised of a digital signal processor (DSP) 16 and a D/A converter 17, as shown in FIG. 4B. The DSP 16 includes an offset adjusting circuit 20, an inverse trigonometric function processor 21 and a gain adjusting circuit 22. The offset adjusting circuit 20 subtracts an offset value from the digital electric signals of the magnetic sensors 4, 5 to provide a pair of output signals $\alpha'$ and $\beta'$ as shown in FIG. 5. The offset value corresponds to the mean value between the maximum signal level and the minimum signal level. The offset value may be a value that corresponds to a weighted average of the maximum and the minimum levels. The inverse trigonometric function processor 21 provides an inverse trigonometric value from the output signals of the offset adjusting circuit 20.

Thus, the characteristic curves $\alpha$ and $\beta$, which are shown in FIG. 3, are converted to cosine curves $\alpha'$ and sine curve $\beta'$ shown in FIG. 5. That is, the sensor assembly provides the following digital output signals Va and Vb, wherein: E represents the amplitude; and L represents a shift value. The gain adjusting circuit 22 equalizes the amplitude E of the cosine and sine curves $\alpha'$ and $\beta'$.

| | |
|---|---|
| Va=E cos L | (Ex. 1) |
| Vb=E sin L | (Ex. 2) |
| The amplitude $E$ can be expressed by the magnetic flux density $B$ and the Hall current as $E=K \cdot I \cdot B$ | (Ex. 3) |
| Because $Vb/Va$=tan $L$ | (Ex. 4) |
| $L$=arc tan($Vb/Va$) | (Ex. 5) |

Thus, L is calculated by the inverse trigonometric function processor 21.

Figure 6:
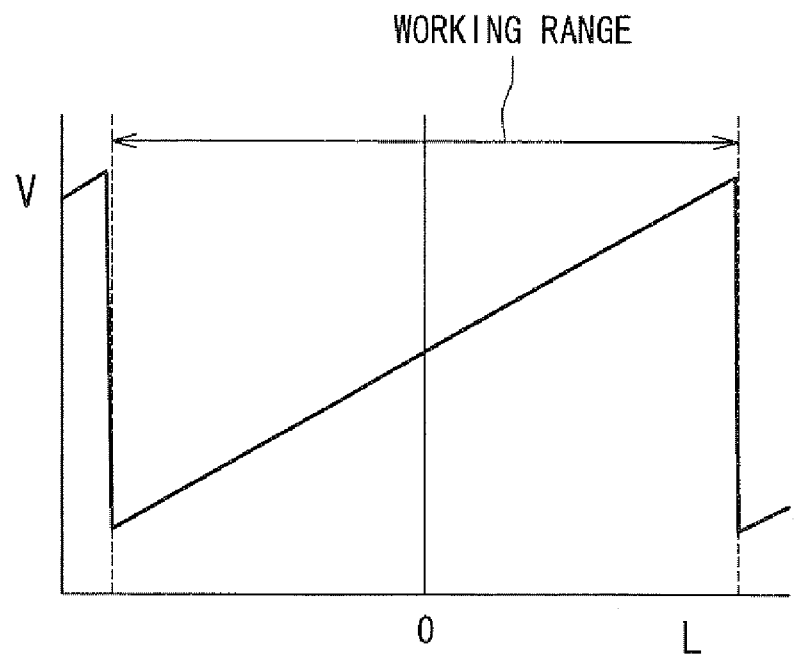
FIG. 6 is a graph showing a relation between the longitudinal position of the permanent magnets and the output voltage level of the sensor assembly.

Then, the inverse trigonometric function processor 21 outputs the following output value V, which is shown in FIG. 6.

$$V=\arctan(Vb/Va) \cdot d/\Pi \quad (6),$$

wherein d/Π is a coefficient for converting the unit "radian" to the unit "millimeter".

Because the member (Vb/Va) almost eliminates temperature dependent variation, the output value V will not change even if the temperature around the sensor changes.

The output value V, which is a digital value, is converted into an analog value by the D/A converter 17 and sent to an ECU to control some device. Hence, it is possible to accurately detect the position of the object without taking the temperature change into account.

A position sensor according to the second embodiment of the invention will be described with reference to FIG. 8.

Incidentally, the same reference numeral indicates the same or substantially the same member, portion, part or unit as the first or previous embodiment hereafter.

Figure 8:
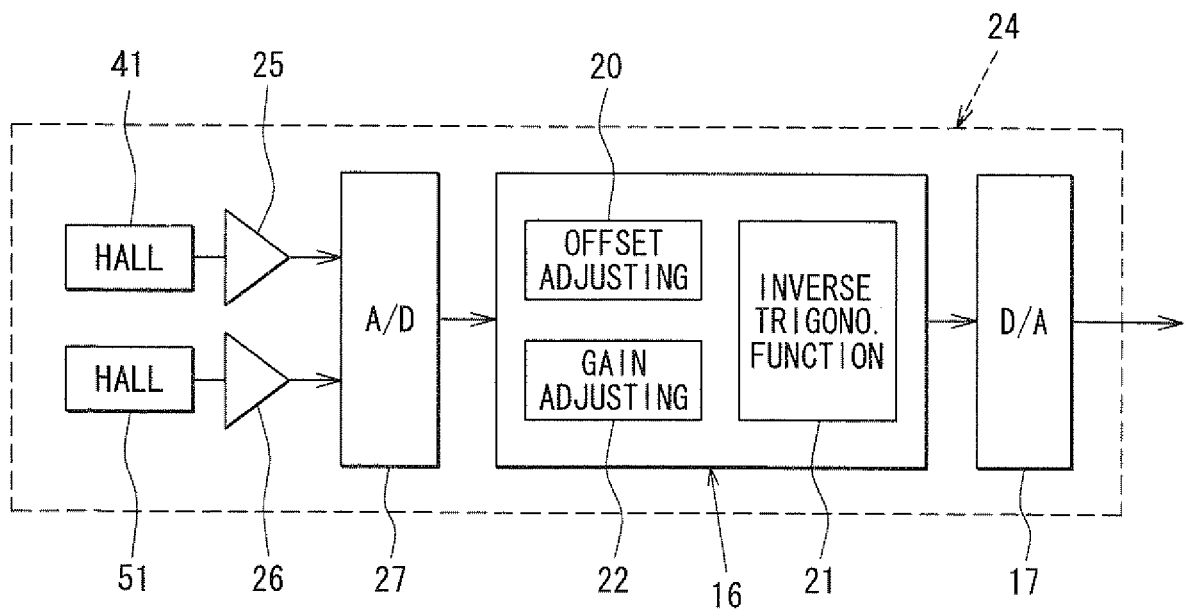
FIG. 8 is a block diagram of a sensor assembly according to the second embodiment of the invention.

As shown in FIG. 8, a sensor assembly 24 includes a pair of Hall elements 41, 51, a pair of operational amplifiers 25, 26 and an A/D converter 27 instead of the pair of magnetic sensors 4, 5 that provides digital electric signals. This embodiment can detect the position of a shift value L between several micrometers and several tens of micrometers.

A position sensor according to the third embodiment of the invention will be described with reference to FIGS. 9A and 9B.

The pair of permanent magnets 2, 3 of the first embodiment is replaced by a single, generally cylindrical permanent magnet 30, which has an inwardly projecting inside surface 40. In other words, the longitudinal cross section of the permanent magnet has an arc-shaped projecting element having a top 30t at the center thereof. The longitudinal cross section of the inside surface corresponds to the arc-shaped projecting elements 2p and 3p of the first embodiment, which confronts each other. The permanent magnet 30 also forms a ring on a plane perpendicular to the longitudinal direction, as shown in FIG. 9A.

The permanent magnet 30 is polarized in the longitudinal direction to have an S-pole at one end thereof and an N-pole at the other end. The magnetic sensors 4, 5 are disposed spaced apart from each other at a distance d/2 in the longitudinal direction inside the permanent magnet 30. Therefore, the digital signals of the magnetic sensors 4, 5 draw approximate cosine characteristic curves α, β as the permanent magnet 30 moves along the horizontal axis thereof from the longitudinal position L=0 of the inside space, as shown in FIG. 3. As a result, the output signal V of the position sensor 1, which is expressed by Ex. (6) and shown in FIG. 6 can be provided.

Because the generally cylindrical shape of the permanent magnet 30 forms a smooth and regular magnetic field, the output signal V can be detected accurately even if the position of the magnetic sensors 4, 5 is shifted in a direction perpendicular to the longitudinal direction a little from a designated position.

A position sensor according to the fourth embodiment of the invention will be described with reference to FIGS. 10A, 10B and 10C.

Figure 9B:
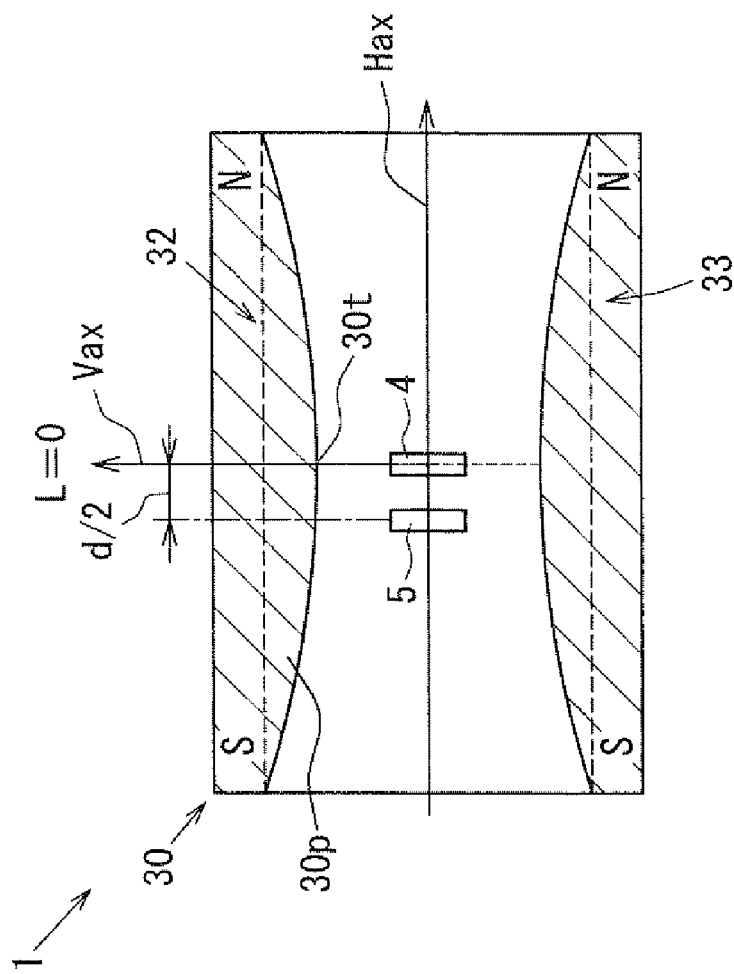
FIGS. 9A and 9B show a position sensor according to the third embodiment of the invention.
Figure 9A:
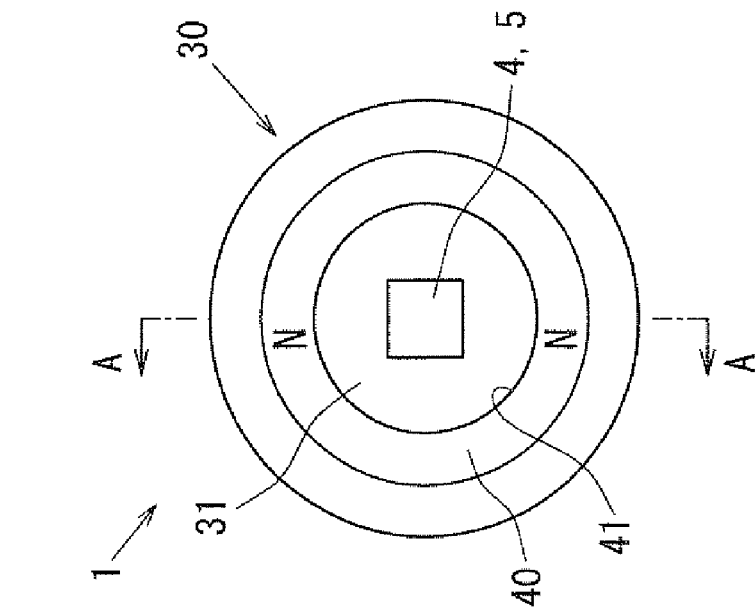

The pair of permanent magnets 2, 3 of the first embodiment is replaced by a pair of semi-cylindrical permanent magnets 32, 33, each of which is a fraction of the cylindrical permanent magnet 30 shown in FIGS. 9A and 9B. In other words, the inside surface corresponds to the arc-shaped projecting element 2p or 3p of the permanent magnet 2 or 3 of the first embodiment. The outside surface may form differently according to a mounting circumstance.

The arcs are generally concentric with the horizontal axis Hax. In other words, the pair of permanent magnets 32, 33 is disposed in a plane symmetric with respect to a symmetry plane that includes the horizontal axis Hax.

Each of the permanent magnets 2, 3 is polarized in the longitudinal direction to have an S-pole at one end thereof and an N-pole at the other end. The pair of permanent magnets 32, 33 is disposed side by side in such that the tops of the projecting elements 32t, 33t confront each other at the center thereof in the longitudinal direction and, also, in such that the same magnetic poles confront each other at the ends thereof, as shown in FIG. 10B. Each of the pair of permanent magnets 32, 33 has an arc-length, or a uniform side width in the circumferential direction along the longitudinal direction as shown in FIG. 10C, thereby forming the permanent magnet member that provides a magnetic field at the inside space onside the permanent magnets 32, 33.

In this magnetic field, magnetic flux density is the maximum at the magnetic center thereof and gradually decreases as the longitudinal position of the space leaves from the magnetic center, as shown in FIG. 2. That is, the arc-shaped projecting elements are formed so that the magnetic flux density characteristic curve changes along a cosine curve S, as shown by a thick solid line in FIG. 7.

The magnetic sensors 4, 5 are disposed spaced apart from each other at a distance d/2 in the longitudinal direction inside the permanent magnets 32, 33. Therefore, the digital signals of the magnetic sensors 4, 5 draw approximate cosine characteristic curves α, β as the permanent magnet 30 moves along the horizontal axis $H_{ax}$ thereof from the Vertical axis $V_{ax}$, as shown in FIG. 3.

Because the generally semi-cylindrical shape of the permanent magnets 32, 33 form a smooth and regular magnetic field, the output signal V can be detected accurately even if the position of the magnetic sensors 4, 5 is shifted in a direction perpendicular to the longitudinal direction a little from a designated position.

Figure 11:
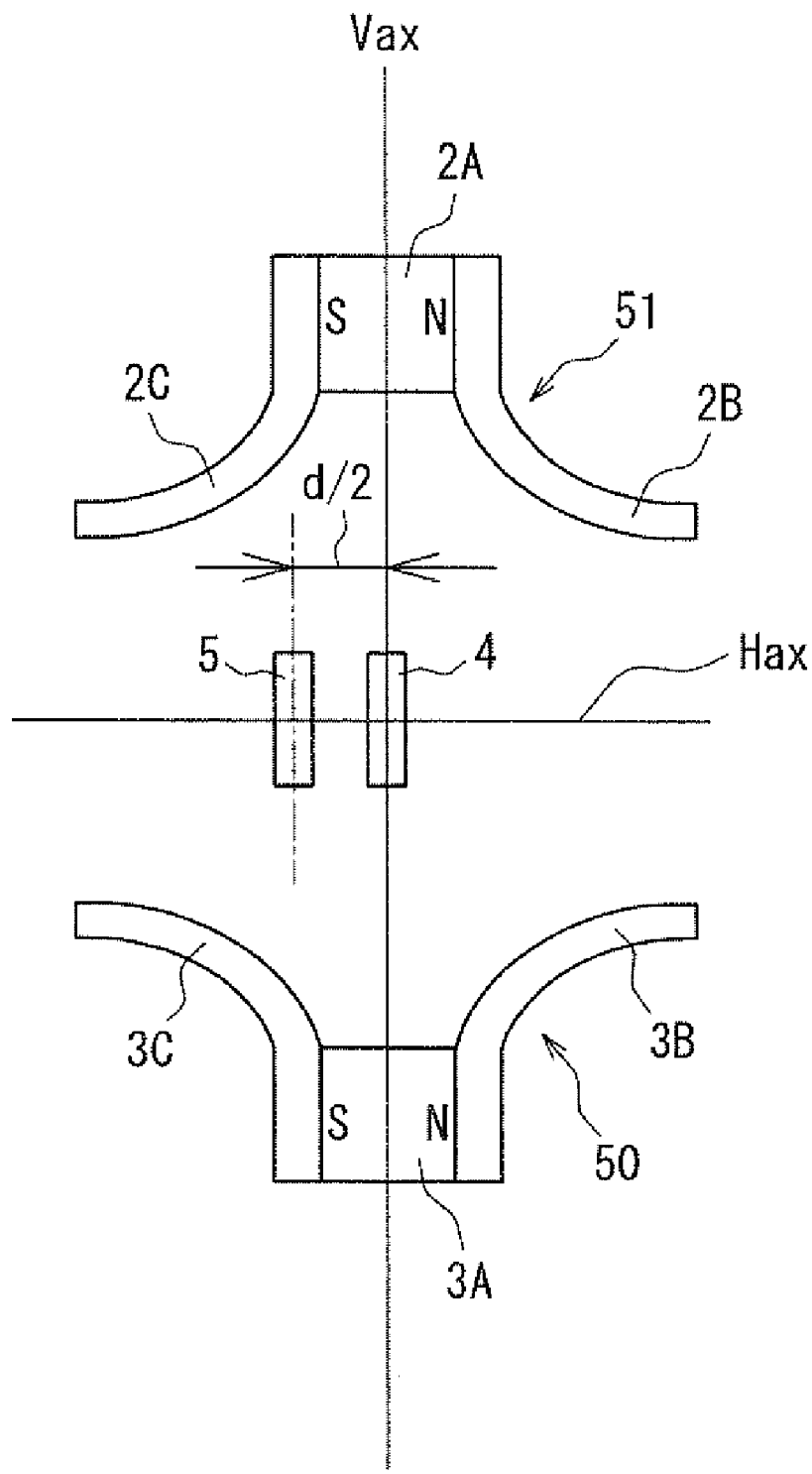
FIG. 11 shows a position sensor according to the fifth embodiment of the invention.

A position sensor 1 according to the fifth embodiment of the invention will be described with reference to FIG. 11.

A position sensor 1 includes a permanent magnet member that is comprised of a pair of magnet members 50, 51 and a sensor assembly that includes a pair of magnetic sensors 4, 5. The pair of magnet members 50, 51 forms a magnetic field and moves in response to a moving object whose position is to be detected.

The pair of magnetic sensors 4, 5 senses a change in the magnetic field and provides a pair of digital electric signals.

Each of the magnet members 50, 51 has a prism-like permanent magnet 2A or 3A and a pair of arc-shaped projecting members 2B, 2C or 3B, 3C that projects from opposite ends of the permanent magnets 2A or 3A. Each of the permanent magnets 2A or 3A is polarized in the longitudinal direction to have an S-pole at one end thereof and an N-pole at the other end. The pair of magnet members 50, 51 is disposed side by side in such that the ends of the pair of arc-shaped projecting members 2B, 2C or 3B, 3C of one magnet member 50 or 51 approaches and confronts the ends of the other pair and, also, in such that the same magnetic poles confront each other. Each of the pair of magnet members 50, 51 also has a uniform side width along the longitudinal direction, thereby forming the permanent magnet member that provides a magnetic field at the space between the magnet members 50, 51. In other words, the pair of magnet members 50, 51 is disposed in plane symmetric with respect to a symmetry plane that includes a horizontal axis Hax. In this magnetic field, magnetic flux density is the maximum at the center thereof in the longitudinal direction and gradually decreases as the longitudinal position of the space leaves from the magnetic center that is included in a vertical axis Vax. That is, the arc-shaped projecting members 2B, 2C, 3B, 3C are formed so that the magnetic flux density characteristic curve changes along a cosine curve S, as shown in FIG. 7.

Figure 12:
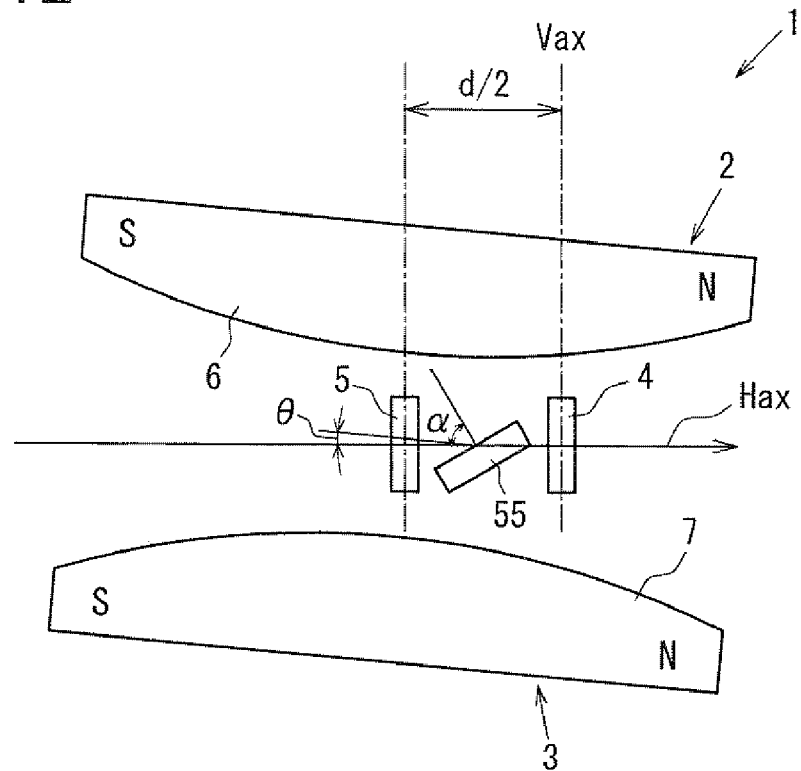
FIG. 12 shows a position sensor according to the sixth embodiment of the invention.
Figure 13:
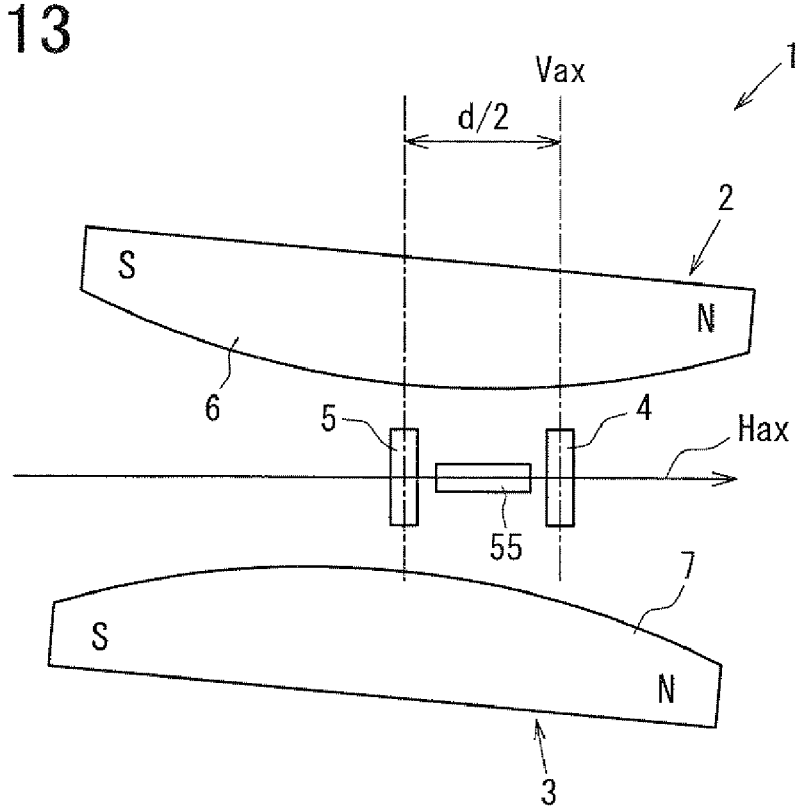
FIG. 13 shows a position sensor according to the seventh embodiment of the invention.

A position sensor 1 according to the sixth embodiment of the invention will be described with reference to FIGS. 12 and 13.

The position sensor 1 includes a permanent magnet member that is comprised of a pair of permanent magnets 2, 3 and a sensor assembly that includes an angle correction magnetic sensor 55 in addition to a pair of main magnetic sensors 4, 5. That is, the position sensor 1 according to the sixth embodiment is substantially the same as the first embodiment except for the angle correction sensor 55 and an angle correcting program. The angle correction magnetic sensor 55 is the same in performance and size as each of the pair of main magnetic sensors 4, 5 and compatible with each other. The angle correction magnetic sensor 55 is disposed at the middle of the space between the main magnetic sensors 4, 5 so that the sensing surface of the angle correction magnetic sensor 55 inclines to a direction of an angle α to the sensing surface of the main magnetic sensors 4, 5, as shown in FIG. 12. The angle correction magnetic sensor 55 can be integrated with the main magnetic sensors 4, 5.

The angle correction magnetic sensor 55 is effective for the position sensor 1 to provide accurate output signals even if the pair of the permanent magnets 2,3 inclines to a direction of an angle θ to the horizontal axis by accident.

When the permanent magnet member that includes the pair of permanent magnets 2, 3 moves along the horizontal axis, the output signal Va of one of the main magnetic sensor and the output signal Vc of the angle correction magnetic sensor 55 are respectively expressed as follows.

$$Va = K \cdot I \cdot B \cos\theta \qquad \text{(Ex 7)}$$

$$Vc = K \cdot I \cdot B \cos(\theta+\alpha) \qquad \text{(Ex 8)}$$

Accordingly:

$$(Va-Vc)/(Va+Vc) = \tan\{(2\theta+\alpha)/2\} \cdot \tan(\alpha/2) \qquad \text{(Ex 9)}$$

$$\theta = \arctan\{(Va-Vc)/(Va+Vc) \cdot \cot(\alpha/2)\} \cdot 180°/\Pi - \alpha/2 \qquad \text{(Ex 10)}$$

Then, the corrected output voltages Va' and Vb' and the shift value L can be expressed as follows.

$$Va' = Va \cos\theta + Vc \cos(\alpha-\theta) \qquad \text{(Ex 11)}$$

$$Vb' = Vb \cos\theta + Vc \cos(\alpha-\theta) \qquad \text{(Ex 12)}$$

$$L = \arctan(Va'/Vb') \cdot d/\Pi \cdot \cos\theta \qquad \text{(Ex 13)}$$

This correction can be made even if the angle correction magnetic sensor 55 is different in performance from the main magnetic sensors 4, 5.

In that case, the following expressions can be used.

$$Va = m \cdot K \cdot I \cdot B \cos\theta \qquad \text{(Ex 14)}$$

$$Vc = n \cdot Kc \cdot Ic \cdot B \cos(\theta+\alpha) \qquad \text{(Ex 15)}$$

In the above expressions, n and m are set so that $m \cdot K \cdot I \cdot B$ and $n \cdot Kc \cdot Ic \cdot B$ can be equalized.

Figure 15:
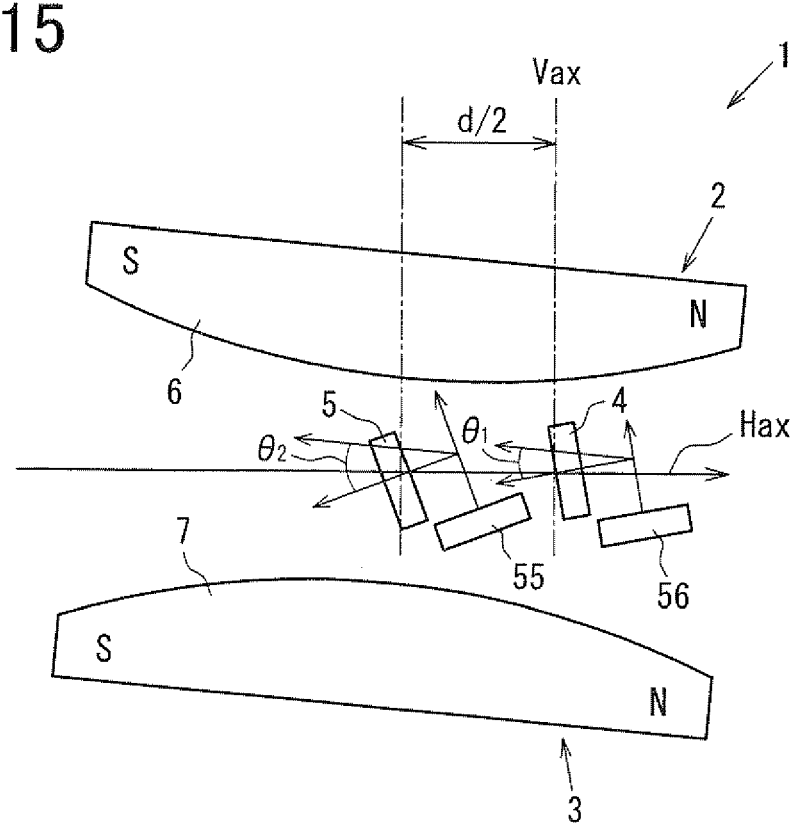
FIG. 15 shows a position sensor according to the ninth embodiment of the invention.

The angle correction magnetic sensor 55 can be disposed so that the sensing surface of thereof can be perpendicular to the sensing surface of the main magnetic sensors 4, 5, as shown in FIG. 15.

In this case, the expressions (Ex 10), (Ex 11) and (Ex 12) are expressed as follows.

$$\theta = \arctan\{(Va-Vc)/(Va+Vc) \cdot 180°/\Pi \qquad \text{(Ex 16)}$$

$$Va' = Va \cos\theta + Vc \sin\theta \qquad \text{(Ex 17)}$$

$$Vb' = Vb \cos\theta + Vc \sin\theta \qquad \text{(Ex 18)}$$

Figure 14:
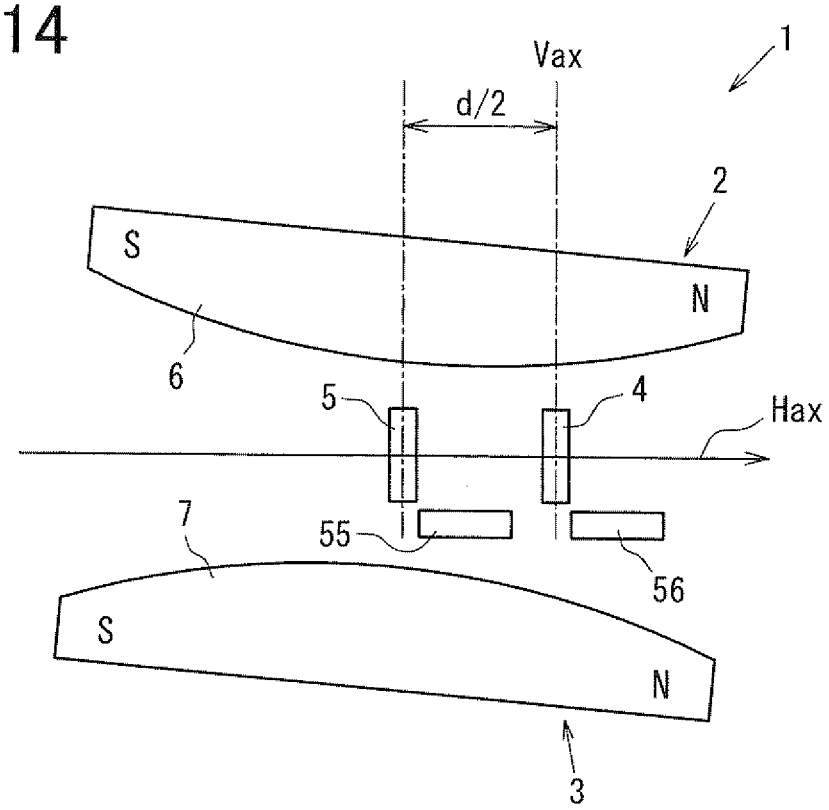
FIG. 14 shows a position sensor according to the eighth embodiment of the invention.

A position sensor 1 according to the seventh embodiment of the invention will be described with reference to FIGS. 14 and 15.

The position sensor 1 includes a permanent magnet member that is comprised of a pair of permanent magnets 2, 3 and a sensor assembly that includes a pair of angle correction magnetic sensors 55, 56 in addition to a pair of main magnetic sensors 4, 5. That is, the position sensor 1 according to the seventh embodiment is substantially the same as the sixth embodiment except for the angle correction sensor 56 and the angle correcting program. The pair of angle correction magnetic sensors 55, 56 is the same in performance and size as each of the pair of main magnetic sensors 4, 5 and compatible with each other. The angle correction magnetic sensors 55, 56 are respectively disposed at the sides of the main magnetic sensors 5, 4 so that the sensing surfaces of the angle correction magnetic sensors 55, 56 face perpendicular to the sensing surface of the main magnetic sensors 5, 4, as shown in FIG. 14. The angle correction magnetic sensors 55, 56 can be integrated with the main magnetic sensors 4, 5.

The angle correction magnetic sensors 55, 56 are effective for the position sensor 1 to provide accurate output signals even if the pair of the permanent magnets 2, 3 inclines to a direction of an angle θ to the horizontal axis by accident, as described previously.

When the permanent magnet member that includes the pair of permanent magnets 2, 3 moves along the horizontal axis Hax, the output signals Va, Vb of the main magnetic sensors 4, 5 and the output signals Vc, Vd of the angle correction sensors 55, 56 are respectively provided.

The corrected output voltage Vb' of the main magnetic sensor 5 is expressed as follows.

$$Vb' = Vb \cos\theta + Vd \sin\theta \qquad \text{(Ex 19)}$$

Because the corrected output voltage Va' is expressed previously in the expression (Ex 11), the shift value L can be obtained by the expression (Ex 13).

If the angles between the sensing surfaces of the main magnetic sensors 4, 5 and each of the permanent magnets 2, 3 are respectively θ1 and θ2, these angles can be expressed as follows.

$$\theta 1 = \arctan(Vc/Va) \cdot 180°/\Pi \qquad (20)$$

$$\theta 2 = \arctan(Vd/Vb) \cdot 180°/\Pi \qquad (21)$$

The corrected output voltages Va', Vb' can be expressed as follows.

$$Va' = Va \cos\theta 1 + Vc \sin\theta 1 \qquad \text{(Ex 22)}$$

$$Vb' = Vb \cos\theta 2 + Vd \sin\theta 2 \qquad \text{(Ex 23)}$$

Then, the shift value can be expressed as follows.

$$L = \arctan(Va'/Vb') \cdot d/\Pi \cdot \cos\{(\theta 1+\theta 2)/2\} \qquad \text{(Ex 24)}$$

In the foregoing description of the present invention, the invention has been disclosed with reference to specific embodiments thereof It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A position sensor comprising:
   a longitudinally extending permanent magnet member having opposite ends polarized to have opposite magnetic poles, each of the opposite ends being configured to surround a common inside space, at least two longitudinally extending arc-shaped projecting magnetic elements respectively projecting from the opposite ends toward the inside space to confront each other at a distance, thereby providing in the inside space a magnetic field whose magnetic flux density becomes a maximum at a longitudinal center of the inside space and gradually becomes smaller as a position of the inside space shifts from the longitudinal center along a longitudinal axis of the permanent magnet members;
   a pair of compatible main magnetic sensors disposed in the inside space along the longitudinal axis at an interval so as to generate a pair of output signals when the permanent magnet member shifts along the longitudinal axis, wherein:
   the arc-shaped projecting elements are arranged so that each of the output signals can be expressed by a cosine of a shift value from the longitudinal center; and
   the interval is ¼ of the cycle of the cosine.

2. A position sensor as in claim 1, wherein:
the permanent magnet member comprises a pair of permanent magnets that have a uniform side width along the longitudinal direction thereof and are disposed side by side in such that the tops of the projecting elements confront each other.

3. A position sensor as claimed in claim 1, wherein the longitudinally extending permanent magnet member (30) is a cylindrical permanent magnet.

4. A position sensor as claimed in claim 2, each of the permanent magnets is a semi-cylindrical member having a uniform side width in a circumferential direction.

5. A position sensor as in claim 1, further comprising:
an offset adjusting circuit for subtracting a mean value of the maximum and minimum of output signals of the main magnetic sensors as an offset value from the output signals of the main magnetic sensors; and
an inverse trigonometric function processor for providing an inverse trigonometric value from an output signal of the offset adjusting circuit.

6. A position sensor as in claim 5, wherein:
each of the magnetic sensor comprises a Hall element; and
the offset adjusting circuit and the inverse trigonometric function processor are integrally formed in a chip.

7. A position sensor as in claim 2, wherein:
each of the arc-shaped projecting element comprises a pair of magnetic yokes respectively extending from opposite ends of one of the permanent magnets.

8. A position sensor as in claim 1, further comprising an angle correction magnetic sensor disposed in the inside space so as to detect an inclination of the pair of main magnetic sensors to a normal direction.

9. A position sensor as in claim 8, wherein:
the pair of main magnetic sensors has sensing surfaces facing to the longitudinal direction of the permanent magnet member; and
the angle correction magnetic sensor has a sensing surface inclined perpendicular to the sensing surfaces of the main magnetic sensors.

10. A position sensor as in claim 8, wherein the angle correcting magnetic sensor is disposed between the pair of main magnetic sensors.

11. A position sensor as in claim 1, further comprising a pair of angle correction magnetic sensors disposed in the inside space so as to detect respective inclinations of the pair of main magnetic sensors to a normal direction.

* * * * *